US012469506B2

(12) United States Patent
Hildenbrand

(10) Patent No.: US 12,469,506 B2
(45) Date of Patent: Nov. 11, 2025

(54) APPARATUS AND METHOD FOR AUDIO DECODING SUPPORTING TWO SPECTRAL BAND REPLICATION MODES

(71) Applicant: Fraunhofer-Gesellschaft zur Foerderung der angewandten Forschung e.V., Munich (DE)

(72) Inventor: Matthias Hildenbrand, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 223 days.

(21) Appl. No.: 18/333,798

(22) Filed: Jun. 13, 2023

(65) Prior Publication Data

US 2024/0420708 A1 Dec. 19, 2024

(51) Int. Cl.
*G10L 19/02* (2013.01)
*G10L 19/22* (2013.01)

(52) U.S. Cl.
CPC .............. *G10L 19/02* (2013.01); *G10L 19/22* (2013.01)

(58) Field of Classification Search
None
See application file for complete search history.

(56) References Cited

U.S. PATENT DOCUMENTS

2010/0286990 A1* 11/2010 Biswas ................. G10L 19/008 704/502
2011/0173006 A1* 7/2011 Nagel ................... G10L 21/038 704/500
2012/0010880 A1* 1/2012 Nagel ................... G10L 21/038 704/E19.01
2012/0275607 A1* 11/2012 Kjoerling .............. G10L 21/038 381/22
2015/0340046 A1* 11/2015 Chen ..................... G10L 19/032 704/500
2017/0270937 A1* 9/2017 Nagel ................... G10L 19/008

FOREIGN PATENT DOCUMENTS

EP 3080803 B1 10/2017

OTHER PUBLICATIONS

Haishan, Z. et al., "QMF Based Harmonic Spectral Band Replication", AES Convention Paper 8517, Oct. 2011, chapter 4.

(Continued)

*Primary Examiner* — Douglas Godbold
(74) *Attorney, Agent, or Firm* — Perkins Coie LLP; Michael A. Glenn

(57) ABSTRACT

An apparatus for audio decoding according to an embodiment is provided. The apparatus comprises a decoding module for decoding a received encoded audio signal to obtain a decoded audio signal having a first bandwidth. Moreover, the apparatus comprises a first spectral band replication module for conducting spectral band replication according to a first spectral band replication mode to obtain a spectral band replicated audio signal. Furthermore, the apparatus comprises a second spectral band replication module for conducting spectral band replication according to a second spectral band replication mode to obtain the spectral band replicated audio signal, wherein the second spectral band replication mode is different from the first spectral band replication mode.

26 Claims, 5 Drawing Sheets

(56) References Cited

OTHER PUBLICATIONS

ISO, “Information technology—Coding of audio-visual objects”, 14496-3:2009/AMD 7:2018, Part 3: Audio, Amendment 7: SBR Enhancements, in particular Subclause 8.A.2, Apr. 20, 2018.
ISO, “Information technology—Coding of audio-visual objects (Uploaded in 3 parts)”, ISO 14496-3:2019, Part 3: Audio, 5th edition.
ISO/IEC, “Information technology—MPEG audio technologies”, FDIS 23003-3, Part 3: Unified speech and audio coding, in particular subclause 4.6.18, chapters 7.5.3 and 7.5.4, Jun. 2020.
“Iibxaac with eSBR support by Ittiam”, https://github.com/ittiam-systems/libxaac, Dec. 27, 2022.

* cited by examiner

APPARATUS AND METHOD FOR AUDIO DECODING SUPPORTING TWO SPECTRAL BAND REPLICATION MODES

BACKGROUND OF THE INVENTION

The present invention relates to audio decoding, to an apparatus and method for audio decoding, in particular, to an apparatus and method for audio decoding supporting two spectral band replication modes, and, more particularly, to workload reduction for HE-AAC decoding with support for MPEG-4 SBR enhancements.

ISO 14496-3:2009/AMD 7 [1] specifies an optional extension to the MPEG-4 SBR algorithm called "SBR Enhancements" (eSBR). This extension is signaled as "esbr_data( )" data field in the SBR extension mechanism.

By making use of this extension, an encoder may utilize two coding tools, which originally have been standardized in the scope of MPEG-D USAC (ISO/IEC 23003-3) [2]. One of these tools, the Harmonic Bandwidth Extension (HBE), optionally replaces the comparably simple and computationally cheap SBR copy up mechanism ("SBR Legacy Patching") with a more sophisticated and computationally costly algorithm.

While SBR Legacy Patching works state-less and without additional algorithmic delay this is not the case for the HBE. The algorithm introduces additional delay in the SBR/QMF signal domain and signal parts from the previous frame are required to generate the HBE output signal of the current frame. In general, (legacy) SBR copy-up patching works state-less while HBE requires one extra frame of delay for decoding.

To be more precise with the notion of delay, let frame(n) be the nth frame from the bitstream (aka. Access Unit, AU) and Decode(n) its decoding process. Now assume that frame(n) indicates that HBE shall be applied during Decode (n). A delay of one frame means that some processing steps of the HBE must be calculated already during the preceding iteration Decode(n−1). Hence, delay does not correspond to a difference in time or samples but processing iterations n.

Within the eSBR tool, there exists a possibility to switch between the harmonic and legacy SBR patching on a frame-by-frame basis, which is controlled by the encoder with the "sbrPatchingMode" bit. To facilitate the frame-by-frame switching between both patching modes, most of the HBE processing is run even during legacy patching to keep the states updated. Furthermore, the legacy patching (if active) is delay aligned to match the delayed harmonic patching.

However, the introduction of HBE in a legacy HE-AACv2 decoder can cause a significant increase in workload, even when the bitstream does not include any SBR Enhancements.

At first, the situation for a MPEG-D USAC decoder is described, which avoids unnecessary workload increase by completely disabling the HBE tool in certain cases.

In case of MPEG-D USAC where the HBE tool has been originally introduced, the tool can be completely disabled as part of the audio configuration when the bit "harmonicSBR" is set to "0". In USAC, the "harmonicSBR" configuration information enables ("1") or completely disables ("0") HBE tool.

The audio configuration is guaranteed to be present prior to decoding the first frame. Therefore, the decoder knows beforehand that the HBE cannot be activated throughout the stream and the HBE processing as well as the additional delay of one frame can be avoided entirely. The operation modes for the MPEG-D USAC decoder can be summarized as follows:

| USAC Bitstream signaling | Delay | Decoder behavior |
|---|---|---|
| harmonicSBR = 0 (config) | No extra delay required | Legacy patching active, HBE processing entirely disabled |
| harmonicSBR = 1 (config), sbrPatchingMode = 1 (legacy patching active) | One frame extra delay | Legacy patching active, HBE processing enabled to keep states updated |
| harmonicSBR = 1 (config), sbrPatchingMode = 0 (harmonic patching active) | One frame extra delay | HBE patching active |

As a consequence, the increased complexity and delay of HBE patching can be controlled and avoided by setting harmonicSBR=0. If HBE patching is not used, no extra complexity and delay results in the decoder.

Now, the situation is described for MPEG-4 SBR Enhancements for legacy HE-AACv2.

A legacy HE-AACv2 decoder implementation without support for MPEG-4 SBR enhancements essentially runs in a mode comparable to the MPEG-D USAC "harmonicSBR=0" configuration case.

FIG. 2 illustrates a structure of such a legacy HE-AAC decoder (similar to USAC decoder with harmonicSBR=0).

As specified in ISO 14496-3:2009/AMD 7, the SBR enhancements cannot be signaled explicitly in the audio configuration but only implicitly as part of the audio frame data in the SBR extension mechanism. This means, that a decoder cannot distinguish in advance a legacy HE-AACv2 bitstream without esbr_data( ) from a bitstream which carries the new esbr_data( ).

Due to the property that the presence of esbr_data( ) is not known by the decoder in advance (e.g., at configuration time) a decoder supporting the MPEG-4 SBR enhancements cannot run in the simple and workload efficient structure which is comparable to the harmonicSBR=0 case in a USAC stream. If it tries to do so and suddenly finds esbr_data( ) extension in the stream it is lacking the HBE states and the signal delay structure to enable the HBE algorithm. Especially the switching of the delay structure cannot be done during decoding without noticeable audio dropouts.

As a consequence, a state-of-the-art HE-AACv2 decoder implementation which supports the SBR enhancements needs to run in a mode which is similar to the USAC "harmonicSBR=1" configuration case. This allows instantaneously activating HBE processing once signaled in the bitstream.

FIG. 3 illustrates a structure of such a HE-AAC decoder supporting SBR enhancements (similar to USAC decoder with harmonicSBR=1).

To summarize, the following operating modes can be distinguished:

| HE-AACv2 stream signaling | Delay | Decoder behavior |
|---|---|---|
| No esbr_data( ) present (existing legacy bitstreams) | One frame extra delay | Legacy patching active, HBE processing enabled to keep states updated |
| esbr_data( ) present, sbrPatchingMode = 1 (legacy patching) | One frame extra delay | Legacy patching active, HBE processing enabled to keep states updated |

-continued

| HE-AACv2 stream signaling | Delay | Decoder behavior |
|---|---|---|
| esbr_data( ) present, sbrPatchingMode = 0 (harmonic patching) | One frame extra delay | HBE patching fully enabled (patching and state update) |

This means that the decoder does not distinguish the first two cases with respect to the updating of HBE states, which has the drawback that the vast majority of existing legacy bitstreams without esbr_data( ) will decode with a significant workload overhead. Due to the algorithmic delay of HBE, most parts of the algorithm are run, even when legacy patching is active to facilitate easy switching.

State-of-the-art HE-AACv2 decoder implementations supporting eSBR run in an operating mode similar to USAC "harmonicSBR=1". Even for legacy HE-AACv2 streams the HBE algorithm runs continuously to be prepared for switching in case esbr_data( ) is found. Especially for e.g. battery-operated devices, this is undesired.

As a consequence, such a standard approach for implementation significantly increases the complexity even for legacy bitstreams. Depending on the implementation, the total increase in complexity can be a factor of 2 or even more.

Existing implementations, which show this state-of-the-art behavior are the MPEG Reference Software [3] as well as the libxaac Open Source Software by Ittiam [4].

It would be highly beneficial if improved concepts for audio decoding with two SBR modes would be provided.

SUMMARY

An apparatus for audio decoding according to an embodiment is provided. The apparatus comprises a decoding module for decoding a received encoded audio signal to obtain a decoded audio signal. Moreover, the apparatus comprises a first spectral band replication module for conducting spectral band replication depending on the decoded audio signal according to a first spectral band replication mode to obtain a spectral band replicated audio signal. Furthermore, the apparatus comprises a second spectral band replication module for conducting spectral band replication depending on the decoded audio signal according to a second spectral band replication mode to obtain the spectral band replicated audio signal, wherein the second spectral band replication mode is different from the first spectral band replication mode. To conduct the spectral band replication, the second spectral band replication module is configured to conduct one or more first processing operations and one or more second processing operations. The one or more second processing operations depend on the one or more first processing operations. The apparatus is configured to receive side information. The second spectral replication module exhibits a state which depends on the side information, the state being one of a deactivated state and one or more activated states. The second spectral band replication module is configured, when the second spectral band replication module is in the deactivated state, to not conduct any operation. Moreover, the second spectral band replication module is configured, when the second spectral band replication module is not in the deactivated state, to conduct at least one of the one or more first processing operations and the one or more second processing operations.

Moreover, a method for audio decoding according to an embodiment is provided. The method comprises:

Decoding a received encoded audio signal to obtain a decoded audio signal,

Conducting, by a first spectral band replication module, spectral band replication depending on the decoded audio signal according to a first spectral band replication mode to obtain a spectral band replicated audio signal. And:

Conducting, by a second spectral band replication module, spectral band replication depending on the decoded audio signal according to a second spectral band replication mode to obtain the spectral band replicated audio signal, wherein the second spectral band replication mode is different from the first spectral band replication mode, wherein the second spectral band replication module is configured to conduct the spectral band replication by conducting one or more first processing operations and one or more second processing operations, wherein the one or more second processing operations depend on the one or more first processing operations.

The method comprises receiving side information, wherein the second spectral replication module exhibits a state which depends on the side information, the state being one of a deactivated state and one or more activated states. When the second spectral band replication module is in the deactivated state, the second spectral band replication module does not conduct any operation. When the second spectral band replication module is not in the deactivated state, the second spectral band replication module conducts at least one of the one or more first processing operations and the one or more second processing operations.

Furthermore, a non-transitory computer-readable medium according to an embodiment, comprising a computer program for implementing the above-described method, when the computer program is executed by a computer or signal processor, is provided.

Embodiments avoid the above-described workload increase. In particular, embodiments to limit the complexity for legacy bitstreams.

Before embodiments of the present invention are described in detail using the accompanying figures, it is to be pointed out that the same or functionally equal elements are given the same reference numbers in the figures and that a repeated description for elements provided with the same reference numbers is omitted. Hence, descriptions provided for elements having the same reference numbers are mutually exchangeable.

DETAILED DESCRIPTION OF THE INVENTION

Figure 1:
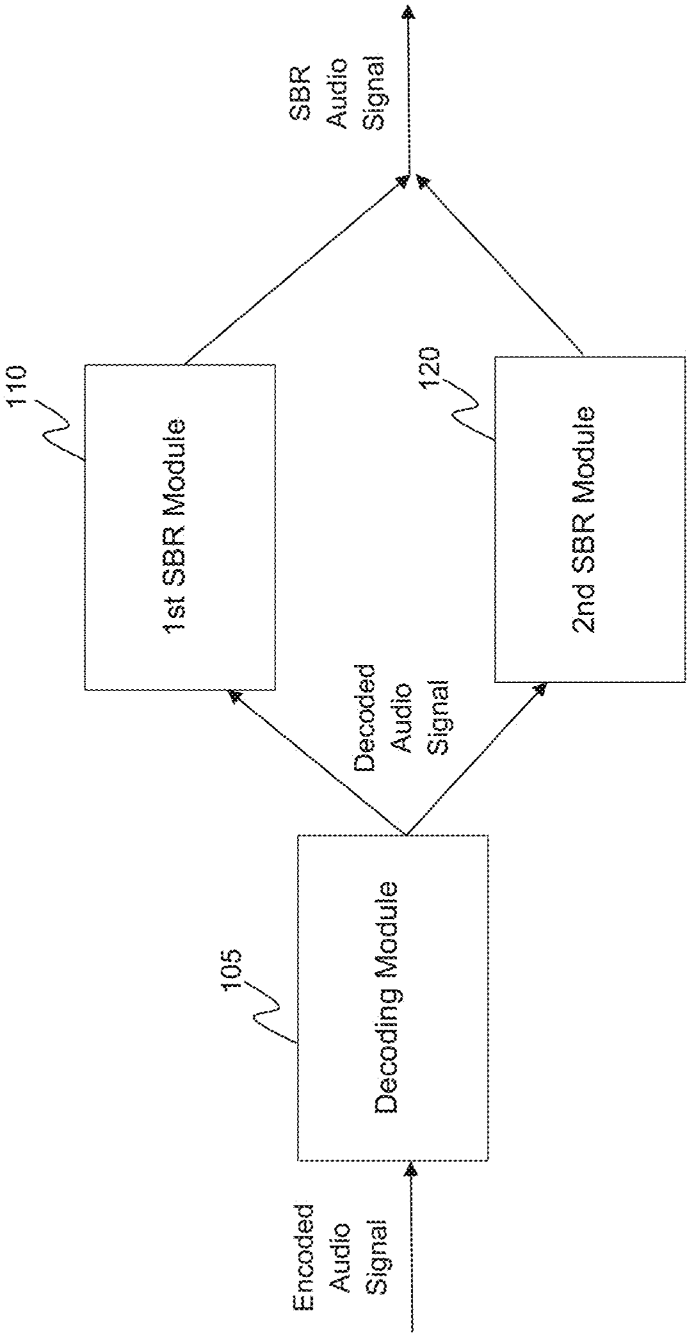
FIG. 1 illustrates an apparatus for audio decoding according to an embodiment.
Figure 2:
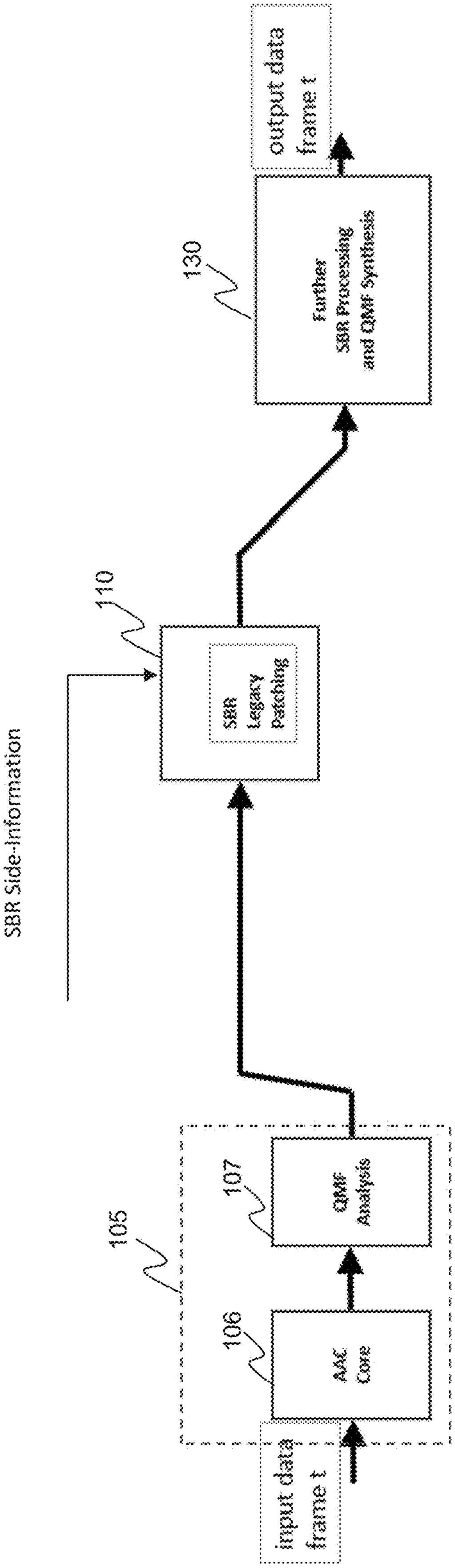
FIG. 2 illustrates a structure of a legacy HE-AAC decoder without enhanced SBR support.

FIG. 1 illustrates an apparatus for audio decoding according to an embodiment.

The apparatus comprises a decoding module 105 for decoding a received encoded audio signal to obtain a decoded audio signal.

Moreover, the apparatus comprises a first spectral band replication module 110 for conducting spectral band replication depending on the decoded audio signal according to a first spectral band replication mode to obtain a spectral band replicated audio signal. For example, the first spectral band replication mode may, for example, be implemented to operate as, e.g., described in [1a], chapter 4.6.18: "SBR tool".

Furthermore, the apparatus comprises a second spectral band replication module 120 for conducting spectral band replication depending on the decoded audio signal according to a second spectral band replication mode to obtain the spectral band replicated audio signal, wherein the second spectral band replication mode is different from the first spectral band replication mode. For example, the second spectral band replication mode may, for example, be implemented to operate as, e.g., described in [5] chapter 4, or as, e.g., described in in [2], chapter 7.5.4: "QMF based harmonic transposer", or as, e.g., described in [2], chapter 7.5.3: "DFT based harmonic transposer", or as, e.g., described in [1a], Annex 8.A.: Combination of the SBR tool with the parametric stereo tool and SBR Enhancements.

To conduct the spectral band replication, the second spectral band replication module 120 is configured to conduct one or more first processing operations and one or more second processing operations. The one or more second processing operations depend on the one or more first processing operations.

The apparatus is configured to receive side information. The second spectral replication module exhibits a state which depends on the side information, the state being one of a deactivated state and one or more activated states. The second spectral band replication module 120 is configured, when the second spectral band replication module 120 is in the deactivated state, to not conduct any operation. Moreover, the second spectral band replication module 120 is configured, when the second spectral band replication module 120 is not in the deactivated state, to conduct at least one of the one or more first processing operations and the one or more second processing operations.

According to an embodiment, the one or more activated states may, e.g., comprise a first activated state (e.g., a pause state) and a second activated state (e.g., an on state). The second spectral band replication module 120 is configured, when the second spectral band replication module 120 is in the first activated state (e.g., the pause state), to conduct the one or more first processing operations but not the one or more second processing operations. Moreover, the second spectral band replication module 120 is configured, when the second spectral band replication module 120 is in the second activated state (e.g., the on state), to conduct at least the one or more second processing operations.

In an embodiment, the second spectral band replication module 120 is configured, when the second spectral band replication module 120 is in the second activated state (e.g., the on state), to conduct both the one or more first processing operations and the one or more second processing operations.

According to an embodiment, if the received side information indicates that a spectral band replicated audio signal according to the second spectral band replication mode shall be output for a subsequent frame of a current frame of the decoded audio data, the apparatus may, e.g., be configured to set the second spectral band replication module 120 into the first activated state, and the second spectral band replication module 120 may, e.g., be configured to conduct the one or more first processing operations by determining information needed for conducting spectral band replication according to the second spectral band replication mode for the subsequent frame.

In an embodiment, spectral band replication in the second processing mode may, e.g., be conducted with exactly one frame delay. For example, the apparatus may, e.g., be configured to switch the second spectral band replication mode from the first activated state (e.g., the pause state) to the second activated state (e.g., the on state) at the beginning of processing said current frame of the decoded audio data. For example, one may, e.g., switch to the second activated state ("ON") immediately after parsing the esbr_data( ) side info before processing the current frame.

According to an embodiment, spectral band replication in the second processing mode may, e.g., be conducted with n frames delay, with n>1. For example, the apparatus may, e.g., be configured to switch the second spectral band replication mode from the first activated state (e.g., the pause state) to the second activated state (e.g., the on state) at the beginning of processing said current frame or up to n−1 frames after processing said current frame of the decoded audio data.

In an embodiment, the second spectral band replication module 120 may, e.g., be configured to calculate the one or more second processing operations in a current frame depending on the one or more first processing operations of a previous frame, which, for example, immediately precedes the current frame.

According to an embodiment, the one or more first processing operations may, e.g., comprise a critical sampling operation. Details on the critical sampling operation are, e.g., be explained in [5] (H. Zhong, L. Villemoes, P. Ekstrand, S. Disch, F. Nagel, S. Wilde, KO. SE. Chong, and T. Norimatsu, "QMF Based Harmonic Spectral Band Replication," AES Convention Paper 8517 October 2011), chapter 4.1 and chapter 4.2. The principles of the critical sampling operation are equally applicable for other domains than the QMF domain, such as the DFT domain. More details are provided, e.g., in [2], chapter 7.5.4: "QMF based harmonic transposer" and in [2], chapter 7.5.3: "DFT based harmonic transposer". Moreover, see [1a], Annex 8.A, which outlines that the harmonic transposers and SBR pre-processing as defined in [2] (ISO/IEC 23003-3) may be used in combination with the SBR tool as defined in subclause 4.6.18. The bitstream element esbr_data( ) as defined in subclause 8.A.2 of [1] conveys the information needed by these tools and is carried in the sbr_extension( ) container of the SBR bitstream.

In an embodiment, the one or more second processing operations may, e.g., comprise at least one of one or more time stretching operations and one or more transposition operations and an overlap adding operation. Details on the time stretching operations and the transposition operations and the overlap adding operation are, e.g., be explained in [5] (H. Zhong, L. Villemoes, P. Ekstrand, S. Disch, F. Nagel, S. Wilde, KO. SE. Chong, and T. Norimatsu, "QMF Based Harmonic Spectral Band Replication," AES Convention Paper 8517 October 2011), chapter 4.1 and chapters 4.3, 4.4 and 4.5. The principles of the time stretching operations and the transposition operations and the overlap adding operation are equally applicable for other domains than the QMF domain, such as the DFT domain. More details are provided, e.g., in [2], chapter 7.5.4: "QMF based harmonic transposer" and in [2], chapter 7.5.3: "DFT based harmonic transposer". Moreover, see again [1a], Annex 8.A, which outlines that the harmonic transposers and SBR pre-processing as defined in [2] (ISO/IEC 23003-3) may be used in combination with the SBR tool as defined in subclause 4.6.18. The bitstream element esbr_data( ) as defined in subclause 8.A.2 of [1] conveys the information needed by these tools and is carried in the sbr_extension ( ) container of the SBR bitstream.

According to an embodiment, the apparatus may, e.g., be configured to set the second spectral band replication module 120 from the deactivated state to one of the one or more activated states depending on a presence of enhanced spectral band replication data (e.g., esbr_data( )) in the side information.

In an embodiment, the apparatus may, e.g., be configured to set the second spectral band replication module 120 from the deactivated state to said one of the one or more activated states further depending on spectral band replication patching mode data(e.g., sbrPatchingMode) of the side information.

According to an embodiment, the apparatus may, e.g., be configured to set the second spectral band replication module 120 from the deactivated state to said one of the one or more activated states, if the side information comprises the enhanced spectral band replication data(e.g., esbr_data( ) and if the spectral band replication patching mode data (e.g., sbrPatchingMode) exhibits a predefined value (e.g. 0) out of two or more values (e.g., 0; 1).

In an embodiment, the apparatus may, e.g., be configured to set the second spectral band replication module 120 into one of the one or more activated states, if the received side information may, e.g., comprise first side information, which indicates that spectral band replication shall be conducted using spectral band replication enhancements.

According to an embodiment, the first side information may, e.g., be encoded in esbr_data( ) side information.

In an embodiment, the apparatus may, e.g., be configured to set the second spectral band replication module 120 into the first activated state, if the received side information may, e.g., comprise second side information, and if the second side information indicates that spectral band replication shall be set to the first activated state (e.g., to the pause state). Moreover, the apparatus may, e.g., be configured to set the second spectral band replication module 120 into the second activated state, if the received side information may, e.g., comprise the second side information, and if the second side information indicates that spectral band replication shall be set to the second activated state (e.g., to the on state).

According to an embodiment, the second side information may, e.g., be encoded in sbrPatchingMode side information.

In an embodiment, a first bit value in the sbrPatchingMode side information indicates that the first spectral band replication mode shall be employed. A second bit value in the sbrPatchingMode side information indicates that the second spectral band replication mode shall be employed.

According to an embodiment, the second spectral band replication module 120 may, e.g., be configured to conduct harmonic band replication.

In an embodiment, the second spectral band replication module 120 may, e.g., be configured to conduct harmonic band replication in a Quadrature Mirror Filter (QMF) domain.

According to an embodiment, the second spectral band replication module 120 may, e.g., be configured to conduct harmonic band replication in a Discrete Fourier Transform (DFT) domain.

In an embodiment, the apparatus may, e.g., be an apparatus for HE-AAC decoding.

According to an embodiment, the decoding module 105 may, e.g., comprise an AAC core decoder 106 for decoding the encoded audio signal to obtain the decoded audio signal.

In an embodiment, the decoding module 105 may, e.g., comprise a QMF analysis module 107. The QMF analysis module 107 may, e.g., be configured to process an output from the decoding module to obtain the decoded audio signal.

According to an embodiment, the apparatus may, e.g., comprise a QMF synthesis module 130. The QMF synthesis module 130 may, e.g., be configured to process the spectral band replicated audio signal to obtain a processed audio signal.

In the following, particular embodiments are described in more detail.

As outlined above, the decoder has no a-priori knowledge (from configuration time) about whether frames with MPEG-4 esbr_data( ) extension and especially esbr_data( ) with sbrPatchingMode=0 ("harmonic patching") will be present in a given stream.

In MPEG-D USAC streams, the eSBR side-info is embedded into the stream aligned with the point in time at which the SBR patching is actually applied. In contrast, MPEG-4 HE-AAC streams with esbr_data( ) extension embed, the side-information is not taking into account the algorithmic delay introduced by the HBE.

It is aimed to avoid workload increases for legacy bitstreams. Running in a legacy HE-AAC decoder structure is not possible, as a presence of esbr_data( ) would require a jump in decoder delay.

According to embodiments, a delay structure is implemented to be prepared for HBE but disabled actual processing until esbr_data( ) is found. Until found for the first time, a fall back to a state-of-the-art (legacy) SBR decoder structure is implemented.

Consequently, according to embodiments, the decoder delays esbr_data( ) by one frame prior to its application.

Figure 4:
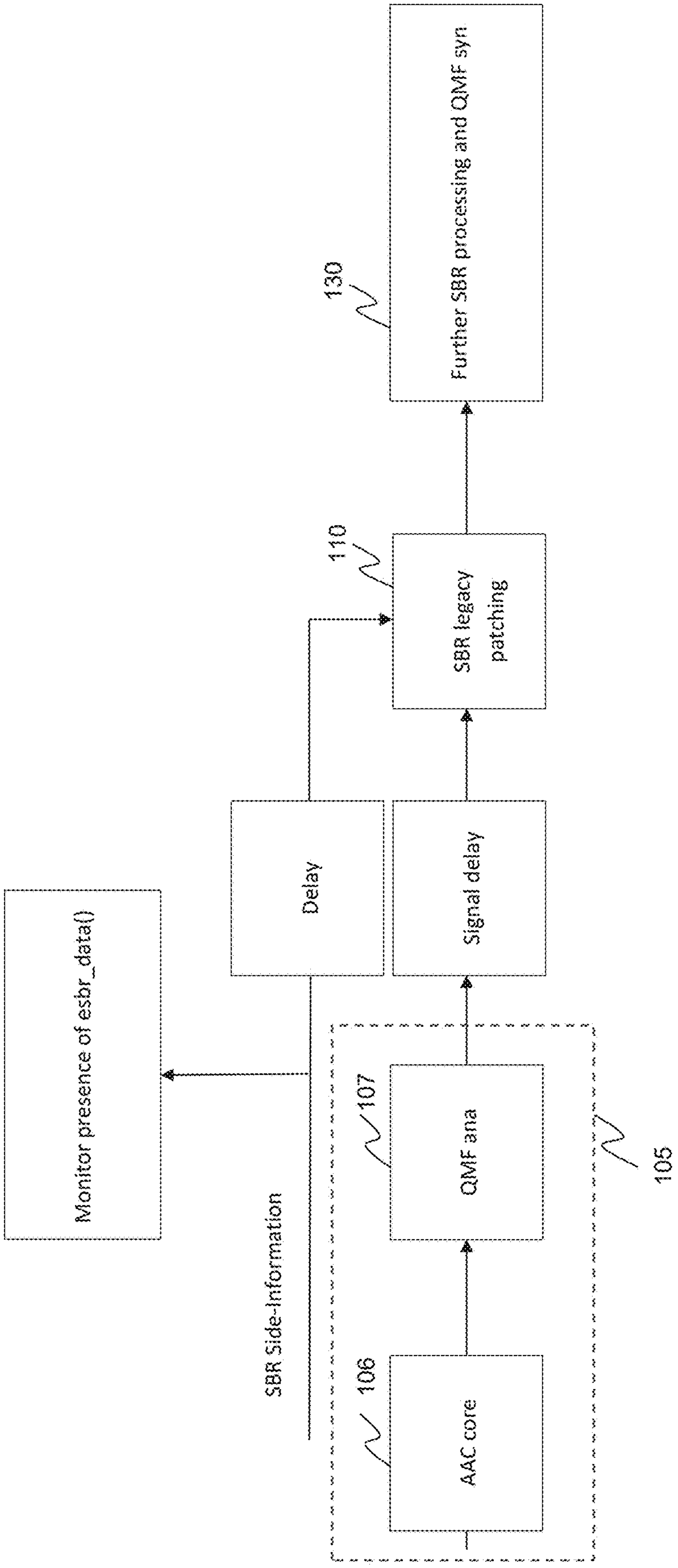
FIG. 4 illustrates a HE-AAC decoder according to an embodiment supporting MPEG-4 SBR Enhancements and in a default operating mode until esbr_data( ) with sbrPatchingMode==0 is found for the first time.

FIG. 4 illustrates a HE-AAC decoder according to an embodiment supporting MPEG-4 SBR Enhancements and running in a default operating mode until esbr_data( ) with sbrPatchingMode==0 is found for the first time. In this mode of operation any additional complexity for decoding legacy HE-AAC bitstreams is completely avoided because the HBE module is switched off completely (state="OFF").

Figure 5:
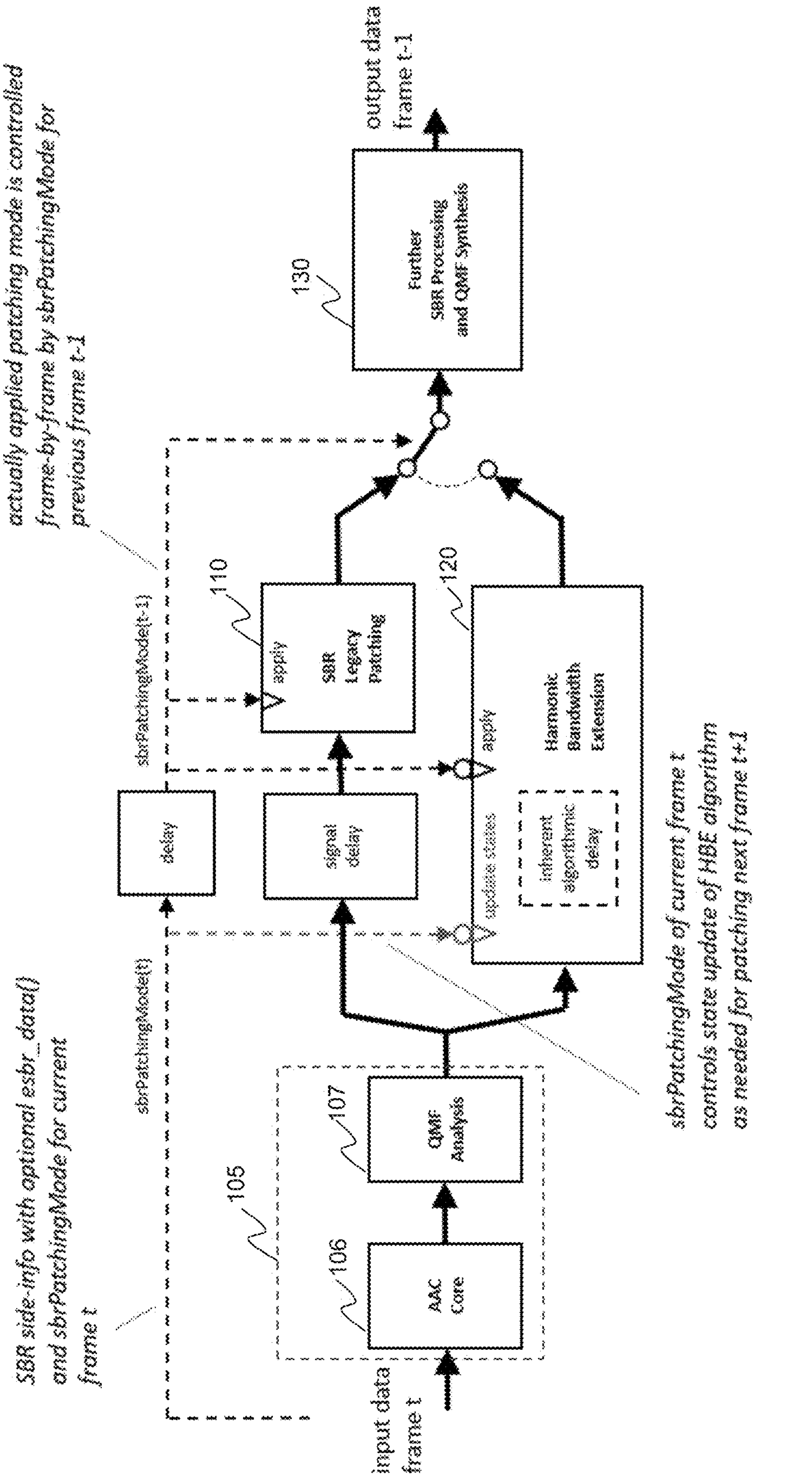
FIG. 5 illustrates a block diagram of an AAC decoder with reduced workload for eSBR decoding according to an embodiment.

Once esbr_data( ) with sbrPatchingMode==0 is found, the HE-AAC decoder switches to a structure according to FIG. 5. During this switch, the HBE module transitions to state "ON" and conducts a one-time re-calculation of missing states. From there on, the HBE module will toggle between states "ON" (harmonic patching in next frame) and "PAUSE" (legacy patching in next frame) depending on the side information. In both states a partial state update causes a basic workload (which is avoided in state "OFF"). However, the full state update and harmonic patching are only calculated when required. Otherwise, the HBE modules operates in state "PAUSE" with reduced workload. Assuming that HE-AAC bitstreams with eSBR use legacy patching much more frequent than harmonic patching, this means that decoding can still be performed at reduced computational costs because the full update of HBE states can be avoided.

In FIGS. 4 and 5, "sbrPatchingMode (t)" denotes the bit which is transmitted in the current frame t and steers the patching algorithm for the next frame t+1. Or, put differently, let "sbrPatchingMode (t−1)" be the delayed bit, which steers the patching algorithm for frame t. The frame index t=[1, 2, 3, 4, . . . ] is used to enumerate successive frames in the input bit stream (=Access Units, AU) and cannot be used directly to infer the amount of processed samples or delay between the input- and output signal.

The operation of the eSBR module is summarized in the below state transition table, where transitions happen on a frame-by-frame basis and events are derived from the side information of the current frame. For example, the update may, e.g., be conducted depending on the current state. The patching may, for example, be conducted depending on the previous state. More specifically, in a particular embodiment, the event "eSbrMode==harmonic", for example, means that the current frame includes esbr_data( ) with sbrPatchingMode==0.

| previous state | event | current state | action |
|---|---|---|---|
| OFF | eSbrMode == harmonic | ON | apply legacy patching<br>do full state update |
| | else | OFF | apply legacy patching |
| ON | eSbrMode == harmonic | ON | apply harmonic patching<br>do full state update |
| | else | PAUSE | apply harmonic patching<br>do partial state update |
| PAUSE | eSbrMode == harmonic | ON | apply legacy patching<br>do full state update |
| | else | PAUSE | apply legacy patching<br>do partial state update |

The proposed implementation structure does not only show benefits for "legacy bitstreams" not carrying esbr_data( ) extension but also for streams with esbr_data( ) present but having set sbrPatchingMode=1 ("legacy patching" in other words: legacy spectral band replication/usual spectral band replication) for multiple consecutive frames. This is a common use case as [1] denotes: "Generally, the usage of the harmonic patching method (sbrPatchingMode==0) is preferable for coding music signals at very low bitrates, where the core codec may be considerably limited in audio bandwidth. This is especially true if these signals include a pronounced harmonic structure. Contrarily, the usage of the regular SBR patching method is preferred for speech and mixed signals, since it provides a better preservation of the temporal structure in speech."

Figure 3:
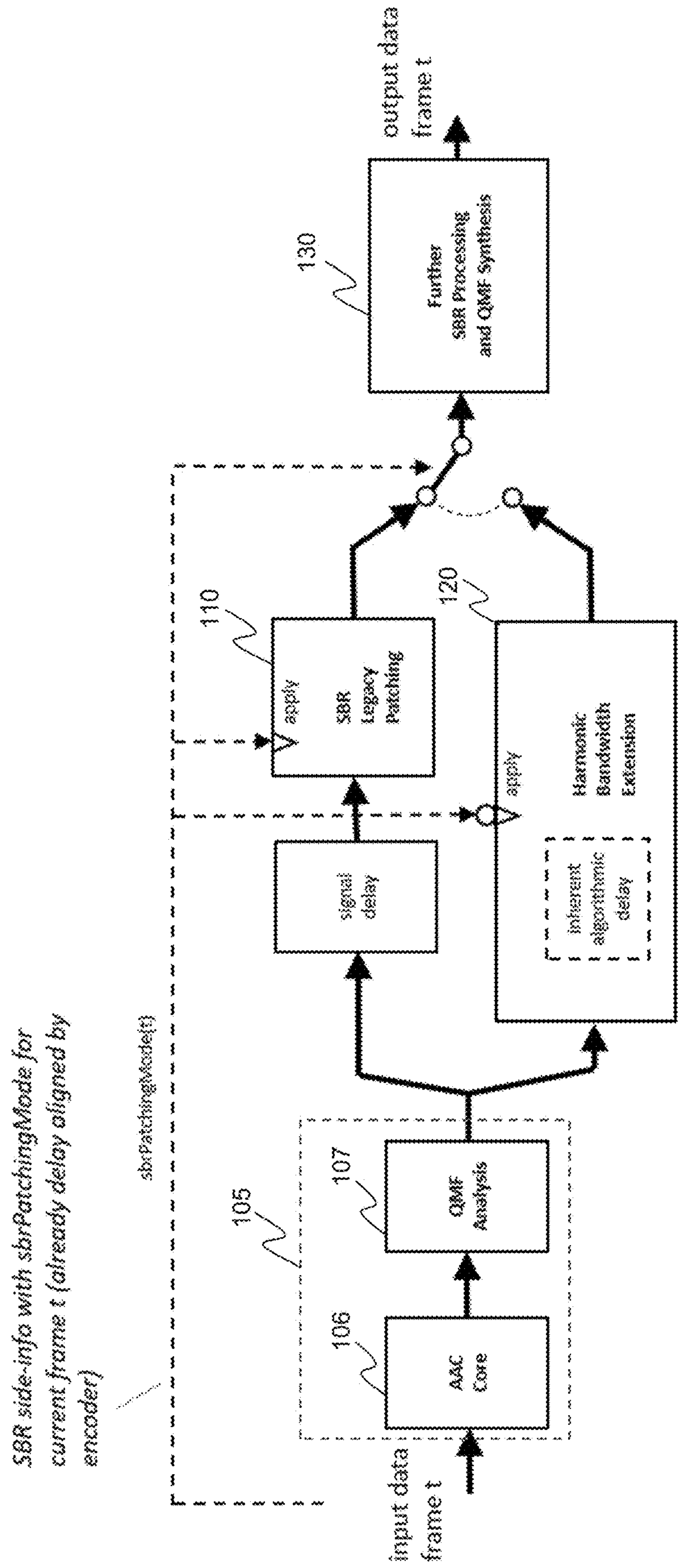
FIG. 3 illustrates a structure of such a HE-AAC decoder supporting SBR enhancements.

For example, embodiments extend [5], chapter 4 "QMF based harmonic SBR", in particular, [5], FIG. 3, as follows:

In the state ON and in state PAUSE, critical sampling may, e.g., always be conducted. Thus, critical sampling may, e.g., be considered as one of the one or more first processing operations mentioned above.

However, stretching and transposition, determining cross products and conducting overlapping and adding may, e.g., only be conducted in state ON, but not in state PAUSE. Thus, stretching and transposition, determining cross products and conducting overlapping and adding may, e.g., be considered as the second processing operations mentioned above.

In state OFF, however, in an embodiment, none of these operations is conducted, not the stretching and transposition, determining cross products and conducting overlapping and adding, and also not the critical sampling. In state OFF, the second spectral band replication module may, e.g., thus be considered to be deactivated.

Embodiments are equally applicable for the DFT domain and SBR in the DFT domain, and for other domains and for SBR in such other domains.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Although each claim only refers back to one single claim, the disclosure also covers any conceivable combination of claims.

REFERENCES

[1] ISO 14496-3:2009/AMD 7:2018 Information technology—Coding of audio-visual objects—Part 3: Audio, Amendment 7: SBR Enhancements

[1a] ISO 14496-3:2019 Information technology—Coding of audio-visual objects—Part 3: Audio, 5th edition.

[2] ISO/IEC FDIS 23003-3 Information technology—MPEG audio technologies—Part 3: Unified speech and audio coding

[3] MPEG Referenz Decoder Software, https://mpeg.expert/software/MPEG/audio/[4] libxaac with eSBR support by Ittiam, https://github.com/ittiam-systems/libxaac), Dec. 27, 2022

[5] H. Zhong, L. Villemoes, P. Ekstrand, S. Disch, F. Nagel, S. Wilde, KO. SE. Chong, and T. Norimatsu, "QMF Based Harmonic Spectral Band Replication," AES Convention Paper 8517 October 2011.

The invention claimed is:

1. An apparatus for audio decoding, wherein the apparatus comprises:

a decoding module for decoding a received encoded audio signal to obtain a decoded audio signal, a first spectral band replication module for conducting spectral band replication depending on the decoded audio signal according to a first spectral band replication mode to obtain a spectral band replicated audio signal, and a second spectral band replication module for conducting spectral band replication depending on the decoded audio signal according to a second spectral band replication mode to obtain the spectral band replicated audio signal, wherein the second spectral band replication mode is different from the first spectral band replication mode, wherein, to conduct the spectral band replication, the second spectral band replication module is configured to conduct one or more first processing operations and one or more second processing operations, wherein the one or more second processing operations depend on the one or more first processing operations, wherein the apparatus is configured to receive side information, wherein the second spectral replication module exhibits a state which depends on the side information, the state being one of a deactivated state and one or more activated states, wherein the second spectral band replication module is configured, when the second spectral band replication module is in the deactivated state, to not conduct any operation, and wherein the second spectral band replication module is configured, when the second spectral band replication module is not in the deactivated state, to conduct at least one of the one or more first processing operations and the one or more second processing operations.

2. An apparatus according to claim 1, wherein the one or more activated states comprise a first activated state and a second activated state, wherein the second spectral band replication module is configured, when the second spectral band replication module is in the first activated state, to conduct the one or more first processing operations but not the one or more second processing operations, and wherein the second spectral band replication module is configured, when the second spectral band replication module is in the second activated state, to conduct at least the one or more second processing operations.

3. An apparatus according to claim 2, wherein the second spectral band replication module is configured, when the second spectral band replication module is in the second activated state, to conduct both the one or more first processing operations and the one or more second processing operations.

4. An apparatus according to claim 2, wherein, if the received side information indicates that a spectral band replicated audio signal according to the second spectral band replication mode shall be output for a subsequent frame of a current frame of the decoded audio data, the apparatus is configured to set the second spectral band replication module into the first activated state, and the second spectral band replication module is configured to conduct the one or more first processing operations by determining information needed for conducting spectral band replication according to the second spectral band replication mode for the subsequent frame.

5. An apparatus according to claim 2, wherein the one or more first processing operations comprise a critical sampling operation.

6. An apparatus according to claim 2, wherein the one or more second processing operations comprise at least one of one or more time stretching operations and one or more transposition operations and an overlap adding operation.

7. An apparatus according to claim 2, wherein the apparatus is configured to set the second spectral band replication module into the first activated state, if the received side information comprises second side information, and if the second side information indicates that spectral band replication shall be set to the first activated state, and wherein the apparatus is configured to set the second spectral band replication module into the second activated state, if the received side information comprises the second side information, and if the second side information indicates that spectral band replication shall be set to the second activated state.

8. An apparatus according to claim 7,
wherein the second side information is encoded in sbrPatchingMode side information.

9. An apparatus according to claim 8,
wherein a first bit value in the sbrPatchingMode side information indicates that the first spectral band replication mode shall be employed, and
wherein a second bit value in the sbrPatchingMode side information indicates that the second spectral band replication mode shall be employed.

10. An apparatus according to 1,
wherein spectral band replication in the second processing mode is conducted with exactly one frame delay.

11. An apparatus according to 1,
wherein spectral band replication in the second processing mode is conducted with n frames delay, with n>1.

12. An apparatus according to claim 1,
wherein the second spectral band replication module is configured to calculate the one or more second processing operations in a current frame depending on the one or more first processing operations of a previous frame.

13. An apparatus according to claim 1,
wherein the apparatus is configured to set the second spectral band replication module from the deactivated state to one of the one or more activated states depending on a presence of enhanced spectral band replication data in the side information.

14. An apparatus according to claim 13,
wherein the apparatus is configured to set the second spectral band replication module from the deactivated state to said one of the one or more activated states further depending on spectral band replication patching mode data of the side information.

15. An apparatus according to claim 14,
wherein the apparatus is configured to set the second spectral band replication module from the deactivated state to said one of the one or more activated states, if the side information comprises the enhanced spectral band replication data and if the spectral band replication patching mode data exhibits a predefined value out of two or more values.

16. An apparatus according to claim 1,
wherein the apparatus is configured to set the second spectral band replication module into one of the one or more activated states, if the received side information comprises first side information, which indicates that spectral band replication shall be conducted using spectral band replication enhancements.

17. An apparatus according to claim 16,
wherein the first side information is encoded in esbr_data side information.

18. An apparatus according to claim 1,
wherein the second spectral band replication module is configured to conduct harmonic band replication.

19. An apparatus according to claim 18,
wherein the second spectral band replication module is configured to conduct harmonic band replication in a Quadrature Mirror Filter domain.

20. An apparatus according to claim 18,
wherein the second spectral band replication module is configured to conduct harmonic band replication in a Discrete Fourier Transform domain.

21. An apparatus according to claim 1,
wherein the apparatus is an apparatus for HE-AAC decoding.

22. An apparatus according to claim 1,
wherein the decoding module comprises an AAC core decoder for decoding the encoded audio signal to obtain the decoded audio signal.

23. An apparatus according to claim 22,
wherein the decoding module comprises a QMF analysis module,
wherein the QMF analysis module is configured to process an output from the decoding module to obtain the decoded audio signal.

24. An apparatus according to claim 23,
wherein the apparatus comprises a QMF synthesis module,
wherein the QMF synthesis module is configured to process the spectral band replicated audio signal to obtain a processed audio signal.

25. A method for audio decoding, wherein the method comprises:
decoding a received encoded audio signal to obtain a decoded audio signal,
conducting, by a first spectral band replication module, spectral band replication depending on the decoded audio signal according to a first spectral band replication mode to obtain a spectral band replicated audio signal, and
conducting, by a second spectral band replication module, spectral band replication depending on the decoded audio signal according to a second spectral band replication mode to obtain the spectral band replicated audio signal, wherein the second spectral band replication mode is different from the first spectral band replication mode, wherein the second spectral band replication module is configured to conduct the spectral band replication by conducting one or more first processing operations and one or more second processing operations, wherein the one or more second processing operations depend on the one or more first processing operations,
wherein the method comprises receiving side information, wherein the second spectral replication module exhibits a state which depends on the side information, the state being one of a deactivated state and one or more activated states,
wherein, when the second spectral band replication module is in the deactivated state, the second spectral band replication module does not conduct any operation, and
wherein, when the second spectral band replication module is not in the deactivated state, the second spectral band replication module conducts at least one of the one or more first processing operations and the one or more second processing operations.

26. A non-transitory computer-readable medium comprising a computer program for implementing the method of claim 25, when the computer program is executed by a computer or signal processor.

* * * * *